UNITED STATES PATENT OFFICE.

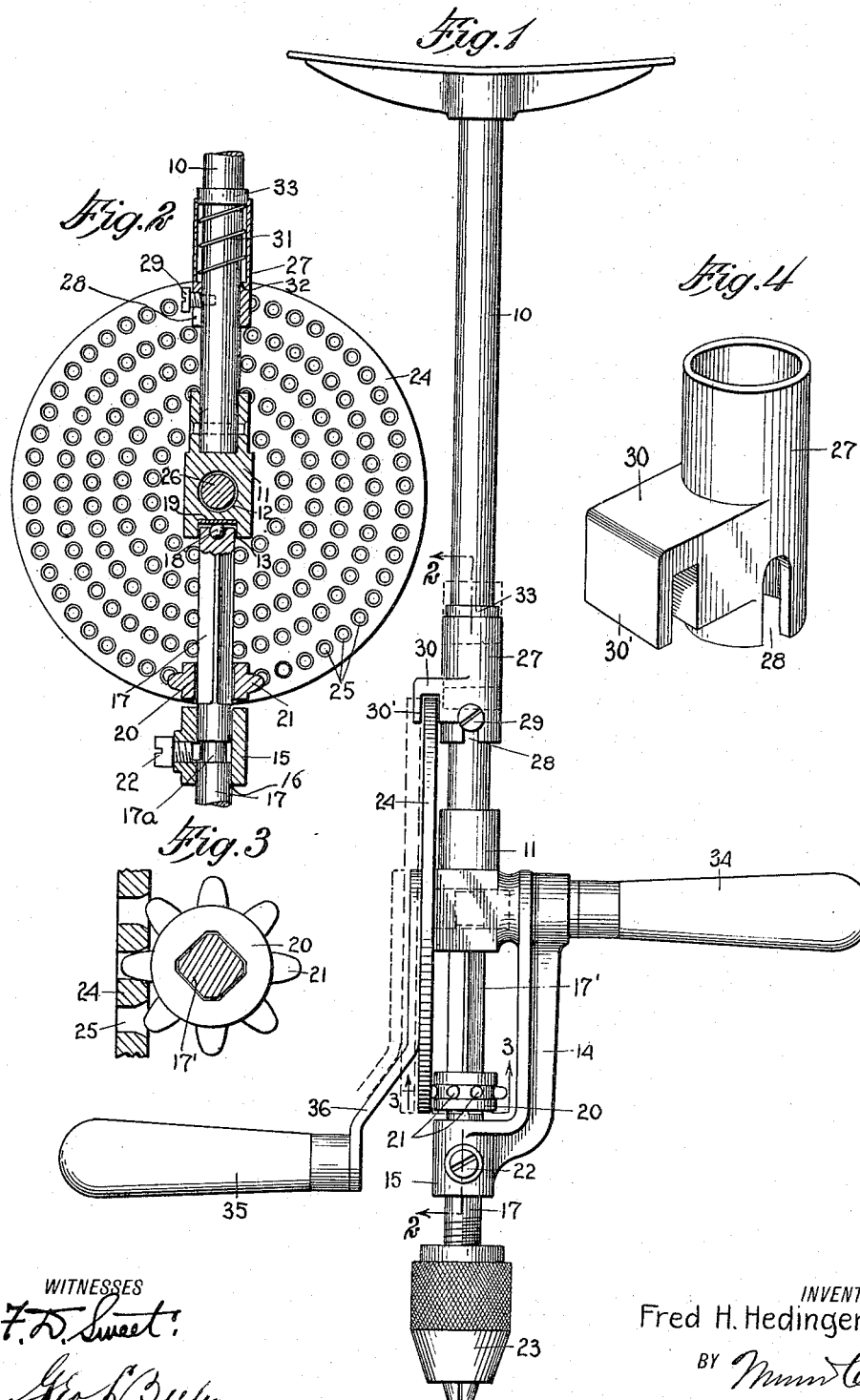
F. H. HEDINGER.
VARIABLE SPEED DRILL.
APPLICATION FILED AUG. 5, 1915.
1,160,891.
Patented Nov. 16, 1915.
INVENTOR
Fred H. Hedinger

FRED H. HEDINGER, OF NEW YORK, N. Y., ASSIGNOR TO JOSEPH ROSENFELD, OF NEW YORK, N. Y.

VARIABLE-SPEED DRILL.

1,160,891.   Specification of Letters Patent.   Patented Nov. 16, 1915.

Application filed August 5, 1915. Serial No. 43,779.

*To all whom it may concern:*

Be it known that I, FRED H. HEDINGER, a citizen of Switzerland, and a resident of the city of New York, Tompkinsville, borough of Richmond, in the county of Richmond and State of New York, have invented a new and Improved Variable-Speed Drill, of which the following is a full, clear, and exact description.

This invention relates to metal working machinery and has particular reference to tools or implements such as breast drills or the like adapted for hand or power operation at variable speeds.

Among the objects of this invention, more definitely stated, is to provide a simple, reliable and quickly manipulated means for changing the gearing through which the speed of the boring or drilling tool may be changed.

With the foregoing and other objects in view, the invention consists in the arrangement and combination of parts hereinafter described and claimed, and while the invention is not restricted to the exact details of construction disclosed herein, still for the purpose of illustrating a practical embodiment thereof reference is had to the accompanying drawings, in which like reference characters designate the same parts in the several views, and in which Figure 1 is a front elevation of the device showing the parts in normal position at the highest speed adjustment and indicating in dotted lines the positions of the movable parts at the time the pinion is to be shifted; Fig. 2 is a vertical transverse section substantially on the line 2—2 of Fig. 1; Fig. 3 is a transverse sectional detail on the broken line 3—3 of Fig. 1; and Fig. 4 is a detail perspective view of the retainer.

Referring more particularly to the drawings, I show a breast drill comprising a main shaft or support 10 to the lower end of which is rigidly connected a socket member 11 having a transverse cylindrical bearing 12 extending into the same from one side and having a bearing socket 13 formed in its bottom. At 14 is shown a bracket formed upon or integral with the socket member 11 and having a bearing hub 15 at its lower end having a vertical bore 16 in alinement with the main shaft or support 10.

A tool spindle 17 is journaled for free rotation in the hub 15 and is provided at its upper end with an anti-friction ball 18 adapted to bear against a bearing disk 19 seated in the bottom of the socket 13. The upper end 17' of the spindle 17 is formed polygonal in cross section for coöperation with a pinion 20 slidable thereon, said pinion being provided with a circular series of peripheral teeth 21 preferably with rounded or spherical ends. The tool spindle 17 has its main bearing in the hub 15 which is of considerable length and that portion of the spindle therein is cylindrical and is retained in position from longitudinal displacement in the bracket and its hub by means of a set screw 22 extending freely into a groove $17^a$ formed in the cylindrical portion of the spindle. Any suitable type of chuck 23 is carried by the lower end of the tool spindle, such feature *per se* not constituting any part of this present invention.

The main driving element comprises a disk-shaped wheel 24 having a plurality of circular series of holes 25, the holes of the several series being concentric with respect to the center of the disk and a cylindrical stud or axle 26 fitted loosely in the socket 12. In its normal position the disk is held closely against the end of the socket member 11 and with the teeth 21 in mesh with one series of the holes 25. This coöperation between the disk and the pinion insures the pinion from endwise movement upon the polygonal portion of the spindle.

As a suitable means for holding the disk positively in said normal position, I provide a retainer in the form of a sleeve 27 fitted upon the main shaft 10 and provided on one face at its lower end with a notch 28 adapted to receive a stud 29 to limit the downward movement of the sleeve and positively to prevent rotation thereof when embracing said stud. The sleeve carries a rigid keeper 30 having a lip 30' adapted to engage over the periphery of the disk 24 in normal position, thereby positively preventing the lateral movement of the disk and the endwise slidable movement of the axle 26 outwardly with respect to the socket 12. The retaining member or sleeve 27 is held resiliently in its normal holding position by means of a spring 31 located within the sleeve and acting between a shoulder 32 therein and a shoulder 33 fixed to or formed upon the main shaft 10. The lower end of the sleeve 27 is smooth and circular but for the notch 28 formed upwardly therein. As is usual with devices of this character, a stationary handle 34 is provided upon the bracket 14 and extends laterally in alinement with the axis of the axle 26. An operating handle 35 also is secured through an arm 36 to the driving member 24.

With the foregoing description, the operation of the device will be readily understood. In order to change the gearing so as to vary the rate of speed of the tool spindle with respect to the angular speed of the driving member, the operator grasps the sleeve 27 and draws it upwardly against the force of the spring 31 far enough for the lip 30' to swing clear of the periphery of the disk 24 and the notched portion of the sleeve to swing clear of the stud 29. Upon rotation of the sleeve at such time, it will be held in its elevated position by reason of the smooth lower edge of the sleeve resting upon the stud 29. The disk 24 and its axle 26 may then be moved outwardly far enough for the pinion 20 to be free from the disk and the pinion may then be moved freely up or down along the polygonal portion of the spindle according to whether the speed is to be lowered or increased. When the teeth of the pinion are brought opposite any desired series of holes 25, the disk and axle may be returned to their normal position where they will be locked again by the return of the keeper to its normal position. In turning the keeper around to the normal position, it will automatically snap into engagement with the disk as soon as the required degree of rotation is given it, by virtue of the force of the spring within the sleeve. The adjustment, therefore, may be quickly accomplished, and, when made, the parts will be retained reliably in the position desired.

I claim:—

1. In a drill, the combination of a socket member, a main shaft secured to the socket member, a tool spindle having one end journaled in the socket member with its axis in alinement with the shaft, a pinion mounted slidably upon the tool spindle and held from rotation thereon independently thereof, a disk-shaped gear having an axle journaled in the socket member perpendicularly to the axis of the shaft and spindle and movable laterally from said axis, said gear member having a plurality of circular series of holes adapted to mesh respectively with the teeth of the pinion, and means carried by the shaft aforesaid serving to hold the gear disk in normal position meshing with the pinion and holding the pinion from endwise movement on its spindle.

2. In a drill, the combination of a main shaft, a socket member carried by the lower end of the shaft, said socket member having a lateral and a bottom bearing socket having their axes at right angles to each other, a bracket secured to the socket member and projecting downwardly terminating in a bearing hub having a bore in alinement with the bottom socket of the socket member, a tool spindle journaled in the hub and having its upper end journaled in said bottom socket, a pinion mounted upon the spindle between the socket member and the hub and adapted to slide along the same but held from rotation thereon independently of the spindle, a gear wheel supported for rotation in the other socket of the socket member and having a plurality of circular series of holes adapted to mesh with the teeth of the pinion in any position of adjustment of the pinion along the spindle, and means to hold the gear wheel from moving laterally out of engagement with the pinion, said last mentioned means including a sleeve surrounding the shaft and having a keeper projecting over the periphery of the wheel, means acting upon the sleeve serving to normally hold the keeper in engaging position, and means to prevent rotation of the retainer when in engaging position.

3. In a drill, the combination of a rigid shaft, a socket member secured to the lower end of the shaft having a bearing socket therein with its axis transverse to the axis of the shaft, a gear wheel journaled in said socket for operation in a plane close to the axis of the shaft, and means slidably mounted upon the shaft adapted to engage the periphery of the wheel and hold it in normal position close to the shaft.

4. In a drill, the combination of a main shaft, a socket member secured to one end of the shaft and having bearing sockets formed therein with their axes at right angles to each other, a wheel journaled in any one of said sockets, a tool spindle journaled in the other of said sockets, a pinion mounted upon the spindle and adapted to slide thereon but being held from rotation independently thereof, said wheel and pinion having interengaging tooth features operative at any desired adjustment of the pinion, the wheel being movable away from the socket member to release the pinion for endwise movement on its spindle, and retainer means on the shaft to hold the gear wheel from lateral movement under normal conditions, said retainer means comprising a sleeve rotatable and endwise movable upon the shaft including a lip engaging around the periphery of the wheel and a spring tending to hold the lip in engaging position.

5. In a drill, the combination of a disk having a plurality of concentric series of holes formed in one side thereof, supporting means for the disk permitting lateral movement thereof, a pinion having a series of round-ended teeth adapted to enter and mesh with the several series of holes and whereby the pinion is held from endwise movement, a spindle on which said pinion is journaled, and means engaging over the periphery of the disk on the side of the axis thereof opposite the pinion serving to normally prevent the lateral movement thereof and disengagement from the pinion.

FRED H. HEDINGER.

Witnesses:
Geo. L. Beeler,
Jos. Rosenfeld.

Copies of this patent may be obtained for five cents each, by addressing the "Commissioner of Patents, Washington, D. C."